(12) United States Patent
Ichihara et al.

(10) Patent No.: US 10,727,495 B2
(45) Date of Patent: Jul. 28, 2020

(54) NITROGEN-CONTAINING CARBON MATERIAL AND PROCESS FOR PRODUCING NITROGEN-CONTAINING CARBON MATERIAL, AND SLURRY, INK, AND ELECTRODE FOR FUEL CELL

(71) Applicant: ASAHI KASEI KABUSHIKI KAISHA, Tokyo (JP)

(72) Inventors: Takeo Ichihara, Tokyo (JP); Hidenori Hinago, Tokyo (JP); Saya Tanaka, Tokyo (JP)

(73) Assignee: ASAHI KASEI KABUSHIKI KAISHA, Tokyo (JP)

( * ) Notice: Subject to any disclaimer, the term of this patent is extended or adjusted under 35 U.S.C. 154(b) by 161 days.

(21) Appl. No.: 15/124,574

(22) PCT Filed: Mar. 11, 2015

(86) PCT No.: PCT/JP2015/057105
§ 371 (c)(1),
(2) Date: Sep. 8, 2016

(87) PCT Pub. No.: WO2015/137377
PCT Pub. Date: Sep. 17, 2015

(65) Prior Publication Data
US 2017/0018783 A1   Jan. 19, 2017

(30) Foreign Application Priority Data
Mar. 11, 2014   (JP) .................... 2014-047414

(51) Int. Cl.
| | |
|---|---|
| *H01M 4/90* | (2006.01) |
| *C09D 11/00* | (2014.01) |
| *H01M 4/96* | (2006.01) |
| *C01B 32/00* | (2017.01) |
| *H01M 8/1018* | (2016.01) |

(52) U.S. Cl.
CPC .......... *H01M 4/9091* (2013.01); *C01B 32/00* (2017.08); *C09D 11/00* (2013.01); *H01M 4/90* (2013.01); *H01M 4/96* (2013.01); *H01M 2008/1095* (2013.01)

(58) Field of Classification Search
CPC ....... H01M 4/9091; H01M 4/96; C01B 32/00; C09D 11/00
See application file for complete search history.

(56) References Cited

U.S. PATENT DOCUMENTS

| | | | |
|---|---|---|---|
| 2006/0263674 A1 | 11/2006 | Hosoya et al. | |
| 2008/0305394 A1* | 12/2008 | Hisamitsu | H01M 4/13 429/209 |
| 2009/0112020 A1 | 4/2009 | Hinago et al. | |
| 2010/0159346 A1 | 6/2010 | Hinago et al. | |
| 2010/0323272 A1 | 12/2010 | Ozaki et al. | |
| 2011/0012296 A1 | 1/2011 | Nakanichi et al. | |
| 2011/0136036 A1 | 6/2011 | Miyata et al. | |
| 2011/0319257 A1 | 12/2011 | Wood et al. | |
| 2012/0094207 A1 | 4/2012 | Wakizaka et al. | |
| 2012/0258381 A1 | 10/2012 | Imai et al. | |
| 2013/0252082 A1* | 9/2013 | Thompkins | H01M 4/587 429/188 |
| 2014/0087289 A1* | 3/2014 | Chokai | H01M 4/90 429/523 |
| 2014/0287343 A1* | 9/2014 | Ono | H01M 4/8605 429/483 |
| 2015/0236353 A1* | 8/2015 | Meunier | H01M 4/9083 429/532 |

FOREIGN PATENT DOCUMENTS

| | | |
|---|---|---|
| CN | 101657921 A | 2/2010 |
| JP | 11-156394 A | 6/1999 |
| JP | 2004-330181 A | 11/2004 |
| JP | 2006-331846 A | 12/2006 |
| JP | 2007-26746 A | 2/2007 |
| JP | 2007-207662 A | 8/2007 |
| JP | 2009-133037 A | 6/2009 |
| JP | 2009-208061 A | 9/2009 |
| JP | 2009-291706 A | 12/2009 |
| TW | 201114488 A1 | 5/2011 |
| TW | 201140926 A1 | 11/2011 |
| WO | WO 2007/043311 A1 | 4/2007 |
| WO | WO 2008/123380 A1 | 10/2008 |
| WO | WO 2012/161335 A1 | 11/2012 |

OTHER PUBLICATIONS

International Search Report for PCT/JP2015/057105 (PCT/ISA/210) dated May 19, 2015.
Written Opinion of the International Searching Authority for PCT/JP2015/057105 (PCT/ISA/237) dated May 19, 2015.
Supplementary European Search Report, dated Dec. 8, 2016, for counterpart European Patent Application No. 15762248.1.

* cited by examiner

*Primary Examiner* — Maria Laios
(74) *Attorney, Agent, or Firm* — Birch, Stewart, Kolasch & Birch, LLP

(57) ABSTRACT

A nitrogen-containing carbon material containing a nitrogen atom, a carbon atom, and a metal element X, in which the atomic ratio (N/C) of the nitrogen atom to the carbon atom is 0.005 to 0.3, the content of the metal element X is 0.1 to 20% by mass, and the average particle diameter is 1 to 300 nm.

6 Claims, 3 Drawing Sheets

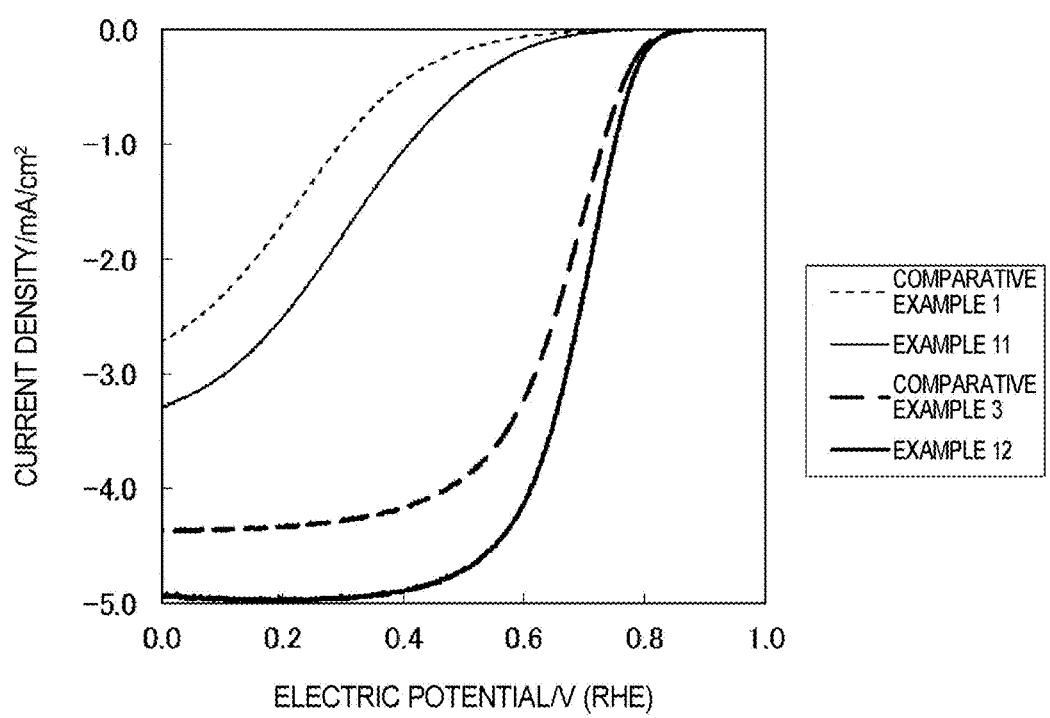
FIGURE 1 ELECTROCHEMICAL MEASUREMENT RESULTS

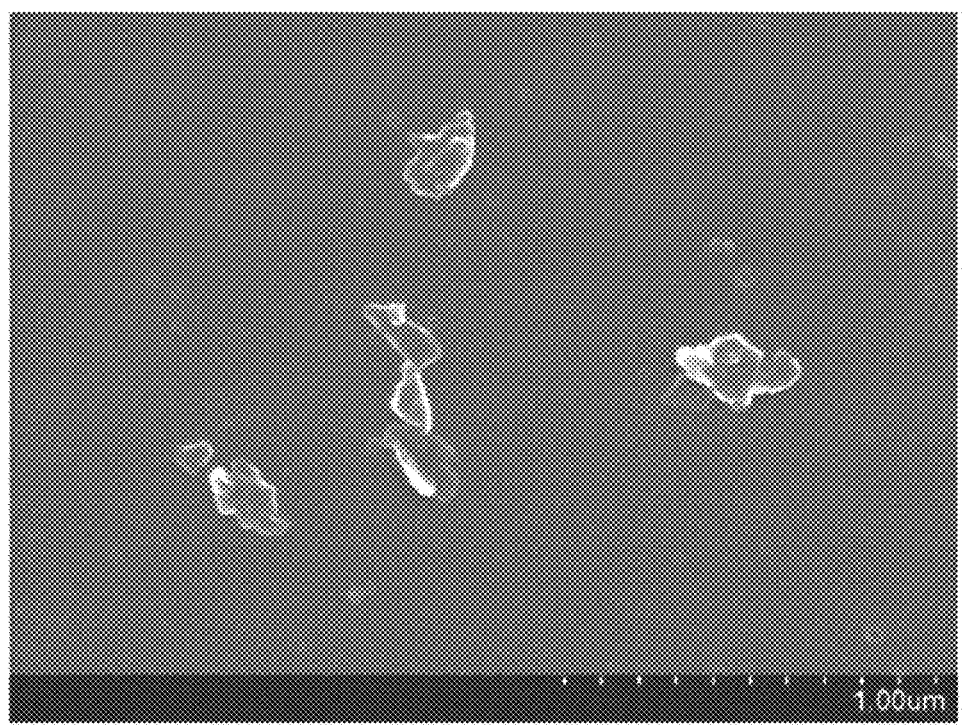
FIGURE 2 SCANNING ELECTRON MICROGRAPH OF EXAMPLE 1

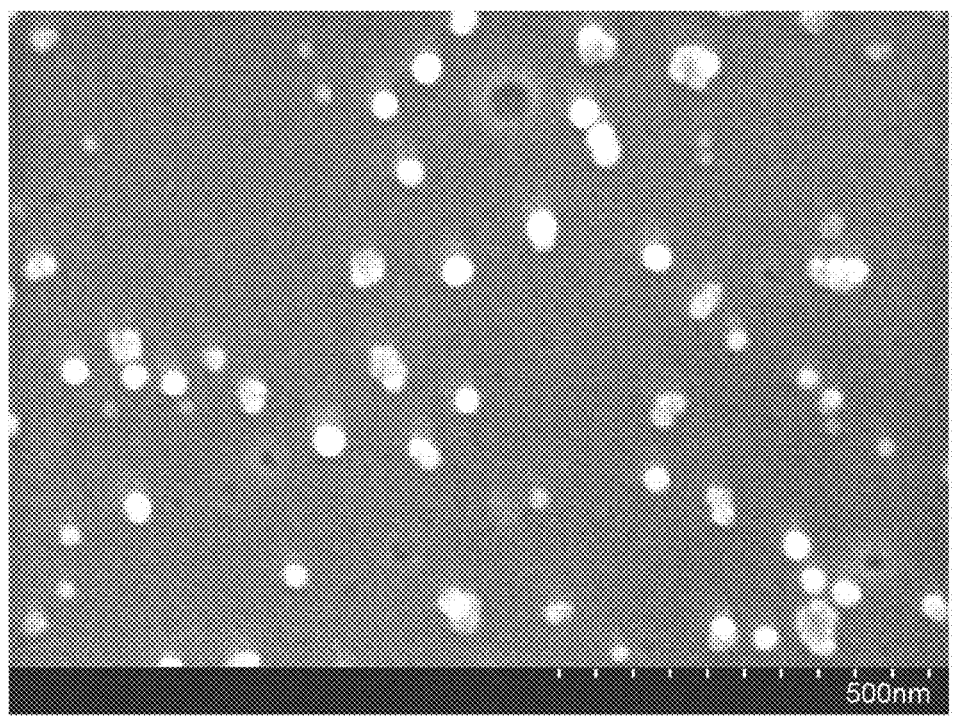
FIGURE 3 SCANNING ELECTRON MICROGRAPH OF EXAMPLE 11

NITROGEN-CONTAINING CARBON MATERIAL AND PROCESS FOR PRODUCING NITROGEN-CONTAINING CARBON MATERIAL, AND SLURRY, INK, AND ELECTRODE FOR FUEL CELL

TECHNICAL FIELD

The present invention relates to a nitrogen-containing carbon material and a process for producing the nitrogen-containing carbon material, and a slurry, an ink, and an electrode for a fuel cell.

BACKGROUND ART

Polymer electrolyte fuel cells have advantages that the power generation efficiency is high, the power density is high, rapid start and stop are possible, and downsizing and weight reduction are possible, and the applications of the polymer electrolyte fuel cells to portable power sources, power sources for movement, small-sized power generators for stationary use, and so on are expected.

In the polymer electrolyte fuel cells, platinum or platinum alloy is generally used as a catalyst in order to facilitate oxygen reduction reaction that occurs on the positive electrode, but resources of platinum are extremely small and platinum is expensive, which is a large obstacle to put platinum into practical use. Thus, a carbon catalyst exhibiting oxygen reduction activity by containing nitrogen and/or a transition metal is getting a lot of attention as an electrode catalyst for fuel cells, the catalyst not needing a noble metal such as platinum.

As an experiment for improving the oxygen reduction activity, in Patent Literature 1, for example, a carbon catalyst formed by assembling, in a non-aggregated state, a carbonized body of shell-like structure having an average particle diameter of 10 to 20 nm is synthesized. Moreover, in Patent Literature 2, a carbon catalyst having an average particle diameter of 317 to 451 nm is synthesized by carbonizing a polymer whose particle shape is controlled.

CITATION LIST

Patent Literature

Patent Literature 1: Japanese Patent Laid-Open No. 2007-207662
Patent Literature 2: International Publication No. WO 2012161335

SUMMARY OF INVENTION

Technical Problem

However, the oxygen reduction activity of conventional carbon catalysts has been still insufficient. In addition, the "average particle diameter of a shell structure" in Patent Literature 1 is the size of a shell structure observed with a transmission electron microscope and present in a primary particle, the "average particle diameter" in the present specification is an average particle diameter of primary particles, and therefore both are different. The "primary particle" means a particle as the minimum unit that can be confirmed as a single particle in observation with a scanning electron microscope.

Thus the present invention has been made in consideration of the above-described circumstances and intends to provide a nitrogen-containing carbon material having a high oxygen reduction activity and a production process thereof, and a slurry, an ink, and an electrode for a fuel cell each containing the nitrogen-containing carbon material.

Solution to Problem

The present inventors have conducted diligent studies in order to solve the problem and have completed the present invention by finding that a nitrogen-containing carbon material containing a predetermined metal element X is made to have an average particle diameter of 300 nm or less, thereby making it possible to improve the oxygen reduction activity in intended purposes such as an electrode for fuel cells.

That is to say, the present invention is as follows.

[1]
A nitrogen-containing carbon material comprising:
a nitrogen atom;
a carbon atom; and
a metal element X;
wherein the metal element X comprises at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au,
an atomic ratio (N/C) of the nitrogen atom to the carbon atom is 0.005 to 0.3,
a content of the metal element X is 0.1 to 20% by mass, and
an average particle diameter is 1 to 300 nm.
[2]
The nitrogen-containing carbon material according to [1], wherein the metal element X comprises iron and/or cobalt.
[3]
A process for producing the nitrogen-containing carbon material according to [1] or [2], the process comprising the steps of:
(a) preparing a precursor comprising a carbon starting material, a nitrogen starting material, and a metal element X starting material; and
(b) subjecting the precursor obtained in the step (a) to a heat treatment to obtain the nitrogen-containing carbon material,
Wherein the metal element X starting material comprises at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au.
[4]
The process for producing the nitrogen-containing carbon material according to [3], the process further comprising the steps of:
(c-1) pulverizing the carbon starting material, the nitrogen starting material, and the metal element X starting material to adjust average particle diameters prior to the step (a);
(c-2) pulverizing the precursor to adjust an average particle diameter after the step (a) and prior to the step (b); and/or (c-3) pulverizing the nitrogen-containing carbon material to adjust an average particle diameter after the step (b).
[5]
The process for producing the nitrogen-containing carbon material according to [4], wherein the pulverization is conducted with a bead mill in the step (c-1), the step (c-2), and/or the step (c-3).

[6]

The process for producing the nitrogen-containing carbon material according to [5], wherein a bead having a bead diameter of 10 to 300 µm is used in the step (c-1), the step (c-2), and/or the step (c-3).

[7]

The process for producing the nitrogen-containing carbon material according to any of [4] to [6], wherein the bead mill is operated under a condition satisfying the following formula (1) to adjust the average particle diameter in the range of 1 to 300 nm in the step (c-1), the step (c-2), and/or the step (c-3):

$$2{,}200 \leq dDv \leq 17{,}000 \quad (1);$$

wherein d represents a true specific gravity [g/cm³] of the bead, D represents a bead diameter [µm], and v represents a peripheral speed [m/s].

[8]

The process for producing the nitrogen-containing carbon material according to any of [3] to [7], wherein the step (b) comprises the steps of:

(b-1) subjecting the precursor to a heat treatment under an inert gas atmosphere; and (b-2) subjecting the precursor to a heat treatment under an ammonia-containing gas atmosphere.

[9]

The process for producing the nitrogen-containing carbon material according to any of [3] to [8], wherein the precursor obtained in the step (a) comprises azulmic acid and/or diaminomaleonitrile.

[10]

A slurry comprising the nitrogen-containing carbon material according to [1] or [2].

[11]

An ink comprising the nitrogen-containing carbon material according to [1] or [2].

[12]

An electrode for a fuel cell, comprising the nitrogen-containing carbon material according to [1] or [2].

[13]

A nitrogen-containing carbon material having an atomic ratio (N/C) of a nitrogen atom to a carbon atom is 0.005 to 0.3 and an average particle diameter of 1 to 100 nm.

[14]

The nitrogen-containing carbon material according to [13], further comprising a transition metal.

[15]

The nitrogen-containing carbon material according to [14], wherein the transition metal comprises iron and/or cobalt.

[16]

The nitrogen-containing carbon material according to [14] or [15], wherein a content of the transition metal is 0.1 to 20% by mass.

[17]

A process for producing a nitrogen-containing carbon material, the process comprising a heat treatment step of subjecting a precursor comprising a carbon starting material and a nitrogen starting material to a heat treatment to obtain the nitrogen-containing carbon material according to any one of [13] to [16].

[18]

The process for producing the nitrogen-containing carbon material according to [17], wherein the precursor comprises azulmic acid and/or diaminomaleonitrile.

[19]

The process for producing the nitrogen-containing carbon material according to [17] or [18], wherein the heat treatment step comprises: a first step of subjecting the precursor to a heat treatment under an inert gas atmosphere; and a second step of subjecting the precursor to a heat treatment under an ammonia-containing gas atmosphere.

[20]

The process for producing the nitrogen-containing carbon material according to any one of [17] to [19], the process further comprising a particle diameter-adjusting step of pulverizing the nitrogen-containing carbon material.

[21]

A slurry comprising the nitrogen-containing carbon material according to any one of [13] to [16].

[22]

An ink comprising the nitrogen-containing carbon material according to any one of [13] to [16].

[23]

An electrode for a fuel cell, comprising the nitrogen-containing carbon material according to any one of [13] to [16].

Advantageous Effects of Invention

According to the present invention, a nitrogen-containing carbon material having a high oxygen reduction activity and a process for producing the nitrogen-containing carbon material, and a slurry, an ink, and an electrode for a fuel cell each containing the nitrogen-containing carbon material can be provided.

BRIEF DESCRIPTION OF DRAWINGS

FIG. 1 shows a graph showing electrochemical measurement results of Examples 11 and 12, and Comparative Examples 1 and 3.

FIG. 2 shows a scanning electron micrograph of Example 1.

FIG. 3 shows a scanning electron micrograph of Example 11.

DESCRIPTION OF EMBODIMENTS

Hereinafter, the embodiment according to the present invention (hereinafter, simply referred to as "present embodiment") will be described in detail with reference to the appended drawings as necessary, but the present invention is not limited to these embodiments, and various modifications are possible within a range that does not deviate from the gist of the present invention.

[Nitrogen-Containing Carbon Material]

The nitrogen-containing carbon material according to the present embodiment contains:

a nitrogen atom, a carbon atom, and a metal element X, in which the metal element X contains at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au, an atomic ratio (N/C) of the nitrogen atom to the carbon atom is 0.005 to 0.3, a content of the metal element X is 0.1 to 20% by mass, and an average particle diameter is 1 to 300 nm.

Conventional nitrogen-containing carbon materials have a relatively large particle diameter from the standpoint of difficulty in synthesizing submicron particles. To the contrary, the present invention improves oxygen reduction activity by making the particle diameter small and setting the atomic ratio (N/C) of the nitrogen atom to the carbon atom and the content of the metal element X to a predetermined range.

[Atomic ratio (N/C)]

The atomic ratio (N/C) of the nitrogen atom to the carbon atom in the nitrogen-containing carbon material is 0.005 to 0.3, preferably 0.01 to 0.2, and more preferably 0.02 to 0.15. The oxygen reduction activity is higher by the atomic ratio (N/C) falling within the range. The atomic ratio (N/C) can be controlled by adjusting the ratio of the carbon starting material to the nitrogen starting material in the process for producing the nitrogen-containing carbon material described later. Moreover, the atomic ratio (N/C) can be measured by the method described in Examples.

[Content of Metal Element X]

The nitrogen-containing carbon material contains a metal element X. A high oxygen reduction activity is exhibited by the nitrogen-containing carbon material containing nitrogen and the metal element X. The content of the metal element X is 0.1 to 20% by mass, preferably 0.5 to 15% by mass, and more preferably 1 to 10% by mass, based on the total amount of the nitrogen-containing carbon material. There is a tendency that the oxygen reduction activity is higher by the content of the metal element X falling within the range.

The metal element X contains at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au; Fe, Co, Ni, Cu, Mn, and/or Cr are preferable, Fe, Co, and/or Cu are more preferable, and Fe and/or Co are still more preferable. There is a tendency that the oxygen reduction activity of the nitrogen-containing carbon material is more improved by using such metal elements X.

[Average Particle Diameter]

The average particle diameter of the nitrogen-containing carbon material according to the present embodiment is 1 nm to 300 nm. The lower limit value of the average particle diameter of the nitrogen-containing carbon material is preferably 5 nm or more, more preferably 10 nm or more, and still more preferably 20 nm or more. The upper limit value of the average particle diameter of the nitrogen-containing carbon material is preferably 290 nm or less, more preferably 280 nm or less, still more preferably 100 nm or less, even still more preferably 80 nm or less, and particularly preferably 60 nm or less. In the case where the nitrogen-containing carbon material is used as an electrode, it is preferable to adjust the average particle diameter suitably in order to exhibit the performance as the electrode efficiently. In the present specification, the projected area of each particle is measured by an image-analyzing method, and the area average of the equivalent circle diameters calculated from the area is defined as the average particle diameter. The specific activity of the electrode is more improved by the average particle diameter being 300 nm or less. Moreover, excessive aggregation among the nitrogen-containing carbon materials is suppressed and inhibition of substance transportation is also suppressed by the average particle diameter being 1 nm or more. Examples of the "inhibition of substance transportation" herein include, a phenomenon that oxygen molecules are hard to supply to an active site in the case where the nitrogen-containing carbon material is used as a positive electrode catalyst for a polymer electrolyte fuel cell. The average particle diameter of the nitrogen-containing carbon material can be adjusted by the particle diameter-adjusting step described later. Moreover, the average particle diameter of the nitrogen-containing carbon material can be measured by the method described in Examples. It is to be noted that the average particle diameter of the nitrogen-containing carbon material is the average particle diameter of primary particles. The primary particle means a particle as the minimum unit that can be confirmed as a single particle in observation with a scanning electron microscope, and the secondary particle means an aggregated particle in which the primary particles aggregate and collect.

[Process for Producing Nitrogen-Containing Carbon Material]

The process for producing the nitrogen-containing carbon material according to the present embodiment includes the steps of:

(a) preparing a precursor containing a carbon starting material, a nitrogen starting material, and a metal element X starting material; and (b) subjecting the precursor obtained in the step (a) to a heat treatment to obtain the nitrogen-containing carbon material, in which the metal element X starting material comprises at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au.

[Precursor Preparing-Step (a)]

The precursor-preparing step (a) is a step of subjecting the carbon starting material, the nitrogen starting material, and the metal element X starting material to complexation to prepare the precursor.

(Precursor)

The precursor is obtained by subjecting the carbon starting material, the nitrogen starting material, and the metal element X starting material to complexation. The precursor can contain another component as necessary. Examples of the another component include, but not limited to, a compound containing boron and/or phosphorus.

The carbon starting material, the nitrogen starting material, and the metal element X starting material are not particularly limited as long as a carbon atom, nitrogen atom, and a metal element X are contained respectively, and one kind of compound may be used as a starting material for the plurality of atoms, or a plurality of compounds may be used as starting materials for the atoms. For example, a metal phthalocyanine containing a carbon atom, a nitrogen atom, and a metal element X may be used alone as the precursor, or a compound obtained by subjecting a carbon black containing a carbon atom, a polyaniline containing a carbon atom and a nitrogen atom, and iron(III) chloride containing a metal element X to complexation may be used as the precursor.

The "compound obtained by subjecting . . . to complexation" may be in a state where the Carbon starting material, the nitrogen starting material, and the metal element X starting material are physically mixed, or may be in a state where the carbon starting material, the nitrogen starting material, and the metal element X starting material form chemical bonds, but it is preferable that the respective materials are uniformly dispersed.

(Carbon Starting material)

Examples of the carbon starting material include organic compounds and carbon materials themselves each having a high carbonization yield. The expression "high carbonization yield" herein is that the yield of a carbon material obtained by applying heat treatment at 1000° C. for 1 hour under a nitrogen gas flow is 1% by mass or more. Examples of the organic compound having a high carbonization yield include, but not limited to, phenol resins, polyfurfuryl alcohol, furan, furan resins, phenol formaldehyde resins, epoxy resins, polyvinylidene chloride, polythiophene, polysulfone, polyvinyl alcohol, polyvinyl butyral, polyesters, polylactic acid, polyethers, polyether ether ketones, cellulose, carboxymethylcellulose, lignin, pitch, polycarbazole, polyacrylic acid, polyacrylic acid esters, polymethacrylic acid esters, and polymethacrylic acid. Examples of the carbon material itself include graphite, activated carbon, amorphous carbon, carbon blacks, coal, charcoal, coke, carbon nanotubes, fullerenes, and graphene. These carbon materials are used singly or in combinations of two or more.

(Nitrogen Starting Material)

As the nitrogen starting material, low-molecular weight nitrogen-containing organic compounds and high-molecular weight nitrogen-containing organic compounds can be used, and mixtures of two or more thereof may be used. Examples of the low-molecular weight nitrogen-containing organic compound include, but not limited to, nitrogen-containing organic compounds having a number average molecular weight of less than 1000. Specific examples of such an organic compound include, but not limited to, diaminomaleonitrile, phthalocyanines, porphyrins, phenanthroline, melamine, acrylonitrile, pyrrole, pyridine, vinyl pyridine, aniline, imidazole, 1-methylimidazole, 2-methylimidazole, benzimidazole, pyridazine, pyrimidine, piperazine, quinoxaline, pyrazole, morpholine, hydrazine, hydrazide, urea, salen, triazine, and cyanuric acid.

Examples of the high-molecular weight nitrogen-containing organic compound include, but not limited to, nitrogen-containing organic compounds having a number average molecular weight of 1000 or more. Specific examples of such an organic compound include, but not limited to, azulmic acid, diaminomaleonitrile polymers, melamine resins, polyamideimide resins, polyacrylonitrile, polyacrylonitrile-polymethacrylic acid copolymers, polypyrrole, polyvinyl pyrrole, polyvinyl pyridine, polyaniline, polybenzimidazole, polyimides, polyamides, chitin, chitosan, polyamino acids, silk, hair, nucleic acids, DNA, RNA, polyurethanes, polyamide amines, polycarbodiimide, polybismaleimide, and polyaminobismaleimides. By using such nitrogen starting materials, the atomic ratio (N/C) of the nitrogen-containing carbon material can be kept within a suitable range.

Among others, it is preferable that azulmic acid and/or diaminomaleonitrile are contained as the nitrogen starting material and carbon starting material, and diaminomaleonitrile is more preferable. There is a tendency that the oxygen reduction activity of the nitrogen-containing carbon material is more improved by azulmic acid and/or diaminomaleonitrile being contained. Moreover, by diaminomaleonitrile, which has a higher dissolvability to solvents, being contained, the complex formation of the metal element X with the nitrogen starting material and the carbon starting material favorably progresses and further, the nitrogen-containing carbon material in which the metal element X is more uniformly dispersed is obtained, and therefore there is a tendency that the oxygen reduction activity of the nitrogen-containing carbon material is more improved.

It is preferable that the precursor obtained in the precursor-preparing step (a) contains azulmic acid and/or diaminomaleonitrile, and diaminomaleonitrile is more preferable. There is a tendency that the oxygen reduction activity of the nitrogen-containing carbon material is more improved by the precursor containing azulmic acid and/or diaminomaleonitrile. Moreover, by the precursor containing diaminomaleonitrile having a higher dissolvability to solvents, the complex formation of the metal element X with the nitrogen starting material and the carbon starting material in the precursor favorably progresses and further, the nitrogen-containing carbon material in which the metal element X is more uniformly dispersed is obtained, and therefore there is a tendency that the oxygen reduction activity of the nitrogen-containing carbon material is more improved.

(Metal Element X Starting Material)

As the metal element X starting material, metal element X salts and metal element X complexes can be used, and mixtures of two or more thereof may be used. Preferable examples of the metal element X includes, but not limited to, Fe, Co, Ni, Cu, Mn, and Cr; Fe, Co, and Cu are more preferable, and Fe and Co are still more preferable. Examples of the metal element X salt include, but not limited to, chlorides, bromides, iodides, nitrates, sulfates, phosphate, acetate, and cyanide of the metal elements X. Examples of the metal element X complex include acetylacetone complexes, cyclopentadienyl complexes, phthalocyanine complexes, porphyrin complexes, and phenanthroline complexes of the metal elements X. There is a tendency that the oxygen reduction activity of the nitrogen-containing carbon material is more improved by using such metal elements X.

Specific examples of the iron salt include, but not limited to, iron(II) chloride, iron(II) chloride tetrahydrate, iron(III) chloride, iron(III) chloride hexahydrate, iron(II) bromide, iron(II) bromide hexahydrate, iron(III) bromide, iron(III) bromide hexahydrate, ammonium hexacyanoferrate(II) trihydrate, potassium hexacyanoferrate(II) trihydrate, ammonium hexacyanoferrate(III), potassium hexacyanoferrate (III), sodium hexacyanoferrate(II) decahydrate, sodium hexacyanoferrate(III) monohydrate, iron(II) nitrate hexahydrate, iron(III) nitrate nonahydrate, iron(III) thiocyanate, iron(II) carbonate, iron(II) carbonate monohydrate, methylammonium hexachloroferrate(III), tetramethylammonium tetrachloroferrate(II), potassium pentacyanonitrosylferrate (III) dihydrate, iron(III) potassium hexacyanoferrate(II) hydrate, sodium pentacyanonitrosylferrate(III) dihydrate, sodium amminepentacyanoferrate(II) trihydrate, sodium aquapentacyanoferrate(II) heptahydrate, iron(II) thiocyanate trihydrate, iron acetate, iron(III) oxalate pentahydrate, iron (II) oxalate dihydrate, iron(III) citrate trihydrate, iron(II) iodide, iron(II) iodide tetrahydrate, iron(III) sulfate, iron(III) sulfate nonahydrate, ammonium tetrachloroferrate(II), iron (II) perchlorate hexahydrate, iron(III) perchlorate hexahydrate, potassium aquapentafluoroferrate(III), iron(III) potassium sulfate dodecahydrate, diammonium iron(II) bis (sulfate) hexahydrate, iron(III) trisodium tris(sulfate) trihydrate, iron(III) phosphate dihydrate, iron(II) phosphate octahydrate, and iron(II) sulfate heptahydrate. Among these iron salts, iron(II) chloride, iron(III) chloride, iron(II) bromide, iron(III) bromide, and iron(III) nitrate nonahydrate are preferable.

Specific examples of the cobalt salt include, but not limited to, potassium hexacyanocobaltate(III), cobalt(II) nitrate hexahydrate, cobalt(II) fluoride, cobalt(II) bromide, cobalt(II) bromide hexahydrate, cobalt(II) carbonate, cobalt (II) thiocyanate trihydrate, cobalt(II) acetate tetrahydrate, cobalt(III) acetate, cobalt(II) chloride, cobalt(II) chloride hexahydrate, cesium tetrachlorocobaltate (II), potassium hexafluorocobaltate(III), cobalt(II) iodide, cobalt(II) iodide hexahydrate, potassium hexanitrocobaltate(III), cobalt(II) phosphate, cobalt(II) phosphate octahydrate, cobalt(II) sulfate, and cobalt(II) sulfate heptahydrate. Among these cobalt salts, cobalt(II) chloride, cobalt(II) bromide, and cobalt(II) nitrate hexahydrate are preferable.

The content of the metal element X in the precursor is preferably 0.01% by mass to 10% by mass, more preferably 0.03% by mass to 5% by mass, and still more preferably 0.05% by mass to 3% by mass. By the content of the metal element X falling within the range, there is a tendency for the oxygen reduction activity of the nitrogen-containing carbon material obtained to be more improved.

Moreover, the nitrogen content in the nitrogen-containing carbon material obtained through the heat treatment step (b) is greatly different depending on the carbon starting material and the nitrogen starting material used, and therefore it is preferable to adjust the ratio of the carbon starting material to the nitrogen starting material so that the atomic ratio (N/C) of the nitrogen atom to the carbon atom in the nitrogen-containing carbon material may fall within the range. The atomic ratio (N/C) can be controlled so as to be large by using a nitrogen starting material having a high atomic ratio (N/C) and/or raising the ratio of the nitrogen starting material in the precursor, and can be controlled so as to be small by using a nitrogen starting material having a low atomic ratio (N/C) and/or reducing the ratio of the nitrogen starting material in the precursor.

Examples of the method of subjecting the nitrogen starting material, the carbon starting material, and the metal element X starting material to complexation include, but not limited to, a method of using, as the precursor, a starting material in which the respective starting materials are subjected to complexation in advance, a method of dissolving the respective starting materials in a solvent and then evaporating the resultant solution to dryness, and a method of physically mixing the respective starting materials with a ball mill or the like. Moreover, the complexation method is not particularly limited, and, for example, all the starting materials may be dissolved in a solvent, or the respective starting materials may be dissolved in different solvents and then the respective solvents may be mixed. The expression "the respective starting materials are subjected to complexation in advance" denotes, for example, the case where a compound that can be the nitrogen starting material, carbon starting material, and metal element X starting material with a single compound, such as an iron phthalocyanine complex, is used as the precursor.

Examples of the compound that can be used as the solvent is not particularly limited, but the compounds having a high solubility of the respective starting materials therein can be used preferably. As the solvent, one solution may be used alone, or two or more solutions may be used in combination.

[Heat Treatment Step (b)]

The heat treatment step (b) is a step of subjecting the precursor containing the carbon starting material and the nitrogen starting material to a heat treatment to obtain the nitrogen-containing carbon material. The heat treatment step (b) may be single-stage heat treatment or two-stage or more heat treatment. Among them, it is preferable that the heat treatment step (b) includes the steps of: (b-1) subjecting the precursor to a heat treatment under an inert gas atmosphere; and (b-2) subjecting the precursor to a heat treatment under an ammonia-containing gas atmosphere, and it is preferable to carry out the step (b-1) and the step (b-2) in this order. The main purpose of the heat treatment under an inert gas atmosphere is to conduct carbonization, and the purpose of the heat treatment under an ammonia-containing gas atmosphere is to conduct activation, and there is a tendency that the nitrogen-containing carbon material superior in oxygen reduction activity is obtained by carrying out the heat treatment step (b).

(Step (b-1))

The inert gas is not particularly limited, and, for example, nitrogen, a rare gas or vacuum can be used. The heat treatment temperature under an inert gas atmosphere is preferably 400 to 1500° C., more preferably 500 to 1200° C., and still more preferably 550 to 1000° C. There is a tendency that the carbonization of the precursor sufficiently progresses by the heat treatment temperature being 400° C. or higher. Moreover, there is a tendency that a sufficient yield is obtained by the heat treatment temperature being 1500° C. or lower.

The heat treatment time under an inert gas atmosphere is preferably 5 minutes to 50 hours, more preferably 10 minutes to 20 hours, and still more preferably 20 minutes to 10 hours. There is a tendency that the carbonization of the precursor sufficiently progresses by the heat treatment time being 5 minutes or longer. Moreover, there is a tendency that a sufficient yield is obtained by the heat treatment time being 50 hours or shorter.

(Step (b-2))

The ammonia-containing gas is not particularly limited, but it is preferable to use ammonia alone or a gas obtained by diluting ammonia with nitrogen or a rare gas. The heat treatment temperature under an ammonia-containing gas atmosphere is preferably 600 to 1200° C., more preferably 700 to 1100° C., and still more preferably 800 to 1050° C. There is a tendency that the activation of the precursor sufficiently progresses to obtain the nitrogen-containing carbon material superior in oxygen reduction activity by the heat treatment temperature being 600° C. or higher. Moreover, there is a tendency that a sufficient yield is obtained by the heat treatment temperature being 1200° C. or lower.

The heat treatment time under an ammonia-containing gas atmosphere is preferably 5 minutes to 50 hours, more preferably 10 minutes to 3 hours, and still more preferably 15 minutes to 2 hours. There is a tendency that the activation of the precursor sufficiently progresses to obtain the nitrogen-containing carbon material superior in oxygen reduction activity by the heat treatment time being 5 minutes or longer. Moreover, there is a tendency that a sufficient yield is obtained by the heat treatment time being 5 hours or shorter.

Part of the metal element X may be removed from the system using hydrochloric acid, sulfuric acid, or the like prior to or after the heat treatment under an inert gas atmosphere and/or the heat treatment under an ammonia-containing gas atmosphere. Particularly in the case where metal element X particles are generated by the heat treatment, it is preferable to remove the metal element X particles from the system from the standpoint of suppressing an increase in the degree of crystallinity. The extent of easiness that the metal element X particles are produced changes depending on the kind, concentration, or dispersibility of the metal element X, or the heat treatment temperature or the like. Moreover, it is preferable to split the heat treatment step under an inert gas atmosphere and/or the heat treatment step under an ammonia-containing gas atmosphere into a plurality of steps and repeat the removal of the metal element X in order to increase the removal rate of the metal element X particles.

[Particle Diameter-Adjusting Step (c)]

Examples of the method of adjusting the average particle diameter include, but not limited to, the methods of carrying out: the step (c-1) of pulverizing the carbon starting material, the nitrogen starting material, and the metal element X starting material to adjust the average particle diameters prior to the step (a); the step (c-2) of pulverizing the precursor to adjust the average particle diameter after the step (a) and prior to the step (b); and/or the step (c-3) of pulverizing the nitrogen-containing carbon material to adjust the average particle diameter after the step (b). It is to be noted that the step (c-1), the step (c-2), and the step (c-3) are also referred to as the particle diameter-adjusting step (c) collectively.

The step (c-1) is a step of pulverizing the starting materials in advance prior to the step (a) to adjust the particle diameter of the nitrogen-containing carbon material obtained. More specifically, it is preferable to adjust the average particle diameter of each starting material to 1 nm to 300 nm. There is a tendency that the oxygen reduction activity of the nitrogen-containing carbon material obtained after the step (a) and the step (b) is more improved by carrying out the step (c-1).

In addition, in the case of controlling the average particle diameter of the precursor in the precursor-preparing step (a), for example, a method of conducting granulation from the solution containing the carbon starting material, the nitrogen starting material, and the metal element X starting material with a spray dryer, or a method of obtaining a fine particle through polymerization can be used.

Moreover, the step (c-2) is a step of pulverizing the precursor after the step (a) and prior to the step (b) to adjust the particle diameter of the nitrogen-containing carbon material obtained. More specifically, it is preferable to adjust the average particle diameter of the precursor to 1 nm to 300 nm. There is a tendency that the oxygen reduction activity of the nitrogen-containing carbon material obtained after the step (b) is more improved by carrying out the step (c-2).

The step (c-3) is a step of pulverizing the nitrogen-containing carbon material to adjust the particle diameter of the nitrogen-containing carbon material after the step (b). More specifically, it is preferable to adjust the average particle diameter of the nitrogen-containing carbon material to 1 nm to 300 nm. There is a tendency that the oxygen reduction activity of the nitrogen-containing carbon material obtained is more improved by carrying out the step (c-3).

In addition, the step (c-1), the step (c-2), and/or the step (c-3) may be carried out in combination. Hereinafter, the pulverization method in the particle diameter-adjusting step (c) (step (c-1), step (c-2), and/or step (c-3)) will be described.

Examples of the pulverization method include pulverization methods with a ball mill, a bead mill, a jet mill, or the like. It is preferable to conduct fine particle formation stepwise in combination of the granulation method and a plurality of pulverization apparatuses because the particle size that can be charged and the particle size after pulverization are different depending on the pulverization apparatus. It is preferable to conduct pulverization with a bead mill, more preferably with a wet type circulating bead mill from the standpoint of adjusting the average particle diameter to 1 nm to 300 nm and of pulverization efficiency. Examples of the method of combining a plurality of pulverization apparatuses include, but not limited to, a pulverization step of preparing the precursor having an average particle diameter of 10 μm with a spray dryer, pulverizing the nitrogen-containing carbon material after the heat treatment with a ball mill to adjust the average particle diameter to about 1 μm, and thereafter further pulverizing the nitrogen-containing carbon material with a bead mill to adjust the average particle diameter to 300 nm or less.

The wet type circulating bead mill is configured of a pulverization chamber, a slurry tank, and a slurry pump. The principle of pulverization and the operation procedures of the wet type circulating bead mill are as follows. First of all, a slurry obtained by dispersing: the carbon starting material, the nitrogen starting material, and the metal element X starting material; the precursor; or the nitrogen-containing carbon material in a solvent is charged into the slurry tank and is introduced to an installation port of the pulverization chamber with the slurry pump. A stirring rod is set in the pulverization chamber, and the precursor or the nitrogen-containing carbon material is pulverized by the beads introduced in the pulverization chamber and stirred at a high speed. The slurry is discharged from a discharge port of the pulverization chamber and returns to the slurry tank. This circulation is repeated to obtain: the carbon starting material, the nitrogen starting material, and the metal element X starting material; the precursor; or the nitrogen-containing carbon material uniformly pulverized. In addition, the installation port and discharge port of the pulverization chamber have a structure that does not leak the beads.

In the case of pulverizing the nitrogen-containing carbon material or the like with a bead mill, wet pulverization is preferable from the standpoint of adjusting the average particle diameter to 1 nm to 300 nm. Solvents that easily disperse the carbon starting material, the nitrogen starting material, and the metal element X starting material; the precursor; or the nitrogen-containing carbon material is preferable, and examples of the solvent include water, ethanol, isopropyl alcohol and mixed solvents thereof. It is preferable that the bead diameter D [μm] is 1 μm to 300 μm from the standpoint of adjusting the average particle diameter to 1 nm to 300 nm. Materials that have a large true specific gravity d [g/cm$^3$] and a high hardness, and are hard to wear are preferable as the material of the bead from the standpoint of pulverization efficiency. Specific examples of the bead include, but not limited to, zirconia, yttria-stabilized zirconia, partially stabilized zirconia with yttria, calcia-stabilized zirconia, partially stabilized zirconia with calcia, magnesia-stabilized zirconia, partially stabilized zirconia with magnesia, ceria-stabilized zirconia, partially stabilized zirconia with ceria, silicon nitride, agate, aluminum, tungsten carbide, chrome steel, and stainless steel. Among these materials, yttria-stabilized zirconia and partially stabilized zirconia with yttria are particularly preferable.

[Operation Procedures of Bead Mill]

Pulverization force can be adjusted in the bead mill according to the operation conditions, but when the pulverization force is too weak, the particle diameter of the nitrogen-containing carbon material or the like cannot be adjusted in a predetermined range, and on the other hand, when the pulverization force is too strong, there is a risk that impurities are mixed in due to wear of beads. The amount of such impurities mixed in is preferably 3% by mass or less, more preferably 2% by mass or less, and still more preferably 1% by mass or less from the standpoint of oxygen reduction activity of the nitrogen-containing carbon material obtained.

In the case where the true specific gravity of the bead is denoted as d [g/cm$^3$], the bead diameter as D [μm], and the peripheral speed as v [m/s], the pulverization force can be adjusted in an appropriate range by operating the bead mill keeping dDv in an appropriate range. The value of dDv is preferably 2,200 to 17,000, more preferably 2,300 to 16,000, and still more preferably 2,400 to 14,400.

It is to be noted herein that the peripheral speed v is the revolving speed of the tip of the stirring rod set in the pulverization chamber of a wet type circulating bead mill.

[Electrode for Fuel Cell]

The electrode for a fuel cell according to the present embodiment contains the nitrogen-containing carbon material. The process for producing the electrode for a fuel cell, containing the nitrogen-containing carbon material according to the present embodiment is not particularly limited, and a general method of preparing an ink containing a nitrogen-containing carbon material, an ionomer, and a solvent, and then applying and drying the ink on a transfer sheet or a gas diffusion electrode can be used (see, for example, Japanese Patent Laid-Open No. 2012-43612).

[Slurry]

The slurry according to the present embodiment contains the nitrogen-containing carbon material. The slurry can contain a solvent or a dispersant as necessary. Moreover, it is preferable that the nitrogen-containing carbon material is obtained through the particle diameter-adjusting step. Examples of the solvent include, but not limited to, water, ethanol, isopropyl alcohol, and mixtures thereof. Examples of the dispersant include, but not limited to, nonionic, anionic, and cationic surfactants.

[Ink]

The ink according to the present embodiment contains the nitrogen-containing carbon material. The ink can contain an ionomer, a solvent, or a dispersant as necessary. Examples of the solvent include, but not limited to, water, ethanol, isopropyl alcohol, and mixtures thereof. Examples include nonionic, anionic, and cationic surfactants.

[Process for Producing Ink]
(Ink-Making Step)

The process for producing the ink according to the present embodiment includes an ink-making step of mixing the slurry and an ionomer. Examples of the ionomer include, but not limited to, ion conductive polyelectrolytes such as perfluorosulfonic acid-based polyelectrolytes and hydrocarbon-based polyelectrolytes generally used in polymer electrolyte fuel cells. Specific examples of the perfluorosulfonic acid-based polyelectrolyte include, but not limited to, Nafion®, Flemion®, and Aciplex®. Specific examples of the hydrocarbon-based polyelectrolyte include, but not limited to, aromatic polyethersulfones.

The method for preparing the ink is not particularly limited, but a method in which the ionomer or a solution of the ionomer is added to the slurry wet pulverized with a bead mill and the resultant mixture is further mixed is preferable from the standpoint of making the nitrogen-containing carbon material and the ionomer into contact efficiently. The slurry wet pulverized with a bead mill may be used as it is, may be diluted by a solvent added as necessary, or may be concentrated with an evaporator or a centrifugal separator. As the mixing method, mixing with a stirring blade, mixing with a bead mill, mixing by ultrasonic irradiation, and so on can be used.

[Intended Purposes]

The nitrogen-containing carbon material according to the present embodiment can suitably be used in electrodes for fuel cells or the like. The electrodes for fuel cells containing the nitrogen-containing carbon material have a high oxygen reduction activity. The method of obtaining an oxygen-reducing electrode, a fuel cell, or the like from an oxygen reduction catalyst is not particularly limited, and general methods of preparing a polymer electrolyte fuel cell can be used.

EXAMPLES

Hereinafter, the present embodiment will be described in more detail by referring to Examples and so on, but these Examples exemplify the present embodiment, and the present embodiment are not limited to the following Examples. A person skilled in the art can make various modifications onto the Examples described hereinafter and carry out the modified Examples as the present embodiment, and such modifications are encompassed within the scope of the present invention.

Analysis methods are as follows.

(Measurement of N/C)

The mass concentration of carbon and of nitrogen in the nitrogen-containing carbon materials obtained in Examples, Comparative Examples, and Reference Examples were measured according to JIS M8819 "Coal and coke-Mechanical methods for ultimate analysis". The mass concentrations were converted to the atomic ratio to determine N/C.

(Measurement of Metal Content)

The nitrogen-containing carbon materials obtained in Examples, Comparative Examples, and Reference Examples were subjected to a heat treatment at 900° C. for 1 hour under an air flow to burn off carbon and nitrogen, and the residue was dissolved in aqua regia and analyzed by ICP atomic emission spectrophotometry to measure the content of the metal element X.

In addition, with respect to mixing of impurities due to wear when yttria-stabilized zirconia or alumina was used as a bead, the content of Zr element, of Y element, and of Al element were converted to the content of $ZrO_2$, of $Y_2O_3$, and of $Al_2O_3$ respectively to determine the contamination ratio (ratio of impurities mixed due to wear of beads:ratio of mixed substances other than the metal element X).

(Measurement of Average Particle Diameter)

The nitrogen-containing carbon materials obtained in Examples, Comparative Examples, and Reference Examples were each dispersed to primary particles in a mixed solvent of water/ethanol and the resultant dispersion were each dried on a copper mesh and then photographed with a scanning electron microscope (product name S-4800 manufactured by Hitachi, Ltd.). From primary particles photographed, 100 primary particles were randomly extracted, and the equivalent circle diameters of respective particles were area averaged to determine the average particle diameter.

(Electrochemical Measurement)

A method for preparing an electrode and a measurement method by linear sweep voltammetry according to a rotating electrode method (rotary electrode apparatus HR-500 and electrochemical measurement system HZ-5000 each manufactured by Hokuto Denko Corp. were used) are described below. First of all, inks were prepared by the methods described in Examples, Comparative Examples, and Reference Examples. The concentration of the nitrogen-containing carbon material and the concentration of Nafion (trade name) in the inks, and the specific gravity of the inks were adjusted to 1.55% by mass, 0.72% by mass, and 0.93 g/cm$^3$ respectively. Then, 2.72 µL of each ink was metered out, applied on a glassy carbon (0.1963 cm$^2$) being a rotary electrode, and air dried. The rotary electrode after nitrogen-containing drying was used as an action electrode, a reversible hydrogen electrode (RHE) was used as a reference electrode, and a carbon electrode was used as a counter electrode. As an electrolytic solution, 0.5 M sulfuric acid was used, oxygen was then bubbled through the electrolytic solution for 30 minutes, and thereafter the electrochemical measurement was conducted sweeping electric potential from 1.1 V to 0 V at a sweeping rate of 5 mV/s and a revolution speed of 1500 rpm. The values of the current density at 0.6 V are shown in Table 1.

Comparative Example 1

<Precursor-Preparing Step (a)>

To a 2 L round-bottomed flask, 20 g of diaminomaleonitrile, 0.045 g of iron(II) chloride, and 500 g of methanol were added, and the resultant mixture was stirred at room temperature for 12 hours. Thereafter, the solvent was removed in a water bath at 50° C. with a rotary evaporator, and the resultant mixture was dried at 80° C. for 2 hours with a vacuum drier to obtain a precursor.

<Heat Treatment Step (b)>

On an aluminum boat, 20 g of the prepared precursor was placed, and the aluminum boat was housed in a box furnace. The temperature in the furnace was raised from room temperature to 900° C. over 60 minutes under a nitrogen flow at 1 NL/min in atmospheric pressure, and was held at 900° C. for 1 hour to obtain 4.1 g of a nitrogen-containing carbon material. The precursor-preparing step (a) and the heat treatment step (b) were repeated to obtain 20 g of the nitrogen-containing carbon material.

rator, and the measurement of N/C, the measurement of the content of the metal element X and the contamination ratio, and the measurement of the average particle diameter were conducted. The results are shown in Table 1.

TABLE 1

|  | Bead specific gravity d [g/cm³] | Bead diameter D [μm] | Peripheral speed v [m/s] | dDv | N/C | Content ratio of metal element X [% by mass] | Contamination ratio [% by mass] | Average particle diameter [nm] | Current density at 0.6 V [mA/cm²] |
| --- | --- | --- | --- | --- | --- | --- | --- | --- | --- |
| Comparative Example 1 | — | — | — | — | 0.21 | 0.5 | 0.0 | 980 | −0.06 |
| Example 1 | 6 | 300 | 2 | 3600 | 0.21 | 0.5 | 0.3 | 290 | −0.15 |
| Example 11 | 6 | 50 | 12 | 3600 | 0.21 | 0.5 | 0.7 | 50 | −0.17 |
| Comparative Example 3 | — | — | — | — | 0.07 | 2.9 | 0.0 | 990 | −3.23 |
| Example 12 | 6 | 50 | 12 | 3600 | 0.07 | 2.9 | 0.6 | 50 | −4.12 |
| Comparative Example 4 | — | — | — | — | 0.11 | 5.5 | 0.0 | 1150 | −2.75 |
| Example 13 | 6 | 50 | 8 | 2400 | 0.11 | 5.5 | 0.5 | 73 | −3.50 |
| Comparative Example 5 | 6 | 50 | 8 | 2400 | 0.001 | 0.0 | 0.8 | 64 | −0.01 |

<Average Particle Diameter-Adjusting Step>

With a planetary ball mill (Pulverisette-5 manufactured by Fritsch Japan Co., Ltd. was used), 20 g of the nitrogen-containing carbon material was dry pulverized and classified using yttria-stabilized zirconia balls (manufactured by Nikkato Corporation) having a diameter of 10 mm to obtain a nitrogen-containing carbon material having an average particle diameter of 980 nm. The measurement of N/C, the measurement of the content of the metal element X, and the measurement of the average particle diameter were conducted using the nitrogen-containing carbon material. The results are shown in Table 1.

<Ink-Preparing Step>

Into a vial, 5 mg of the nitrogen-containing carbon material was weighed out, then about 50 mg of glass beads, 50 μL of a Nafion (trade name) 5% by mass dispersion (manufactured by Sigma-Aldrich Japan, LLC), and 150 μL each of ion-exchanged water and ethanol were added thereto, and the resultant mixture was irradiated with ultrasonic waves for 20 minutes to prepare a slurry. The electrochemical measurement was conducted using this ink. The result is shown in Table 1 and FIG. 1.

Example 1

<Average Particle Diameter-Adjusting Step>

The nitrogen-containing carbon material obtained in Comparative Example 1 was wet pulverized with a bead mill (Ultra Apex Mill manufactured by Kotobuki Industries Co., Ltd. was used). Specifically, a slurry containing 10 g of the nitrogen-containing carbon material obtained in Comparative Example 1, 300 mL of ion-exchanged water, and 300 mL of ethanol was pulverized at a peripheral speed of v=2 m/s over 6 hours using beads made of yttria-stabilized zirconia (manufactured by Nikkato Corporation, true specific gravity d=6 g/cm³) and having a bead diameter D=300 μm. The value of dDv was 3,600.

<Ink-Preparing Step>

Into a vial, 289 μL of the obtained slurry was weighed out, then three spatulas of glass beads and 50 μL of a Nafion (trade name) 5% by mass dispersion (manufactured by Sigma-Aldrich Japan, LLC) were added thereto, and the resultant mixture was irradiated with ultrasonic waves for 20 minutes to prepare an ink. The electrochemical measurement was conducted using this ink. The result is shown in Table 1 and FIG. 1.

<Drying of Sample>

The solvent in the slurry obtained in the average particle diameter-adjusting step was removed with a rotary evaporator.

Example 2

<Average Particle Diameter-Adjusting Step>

Pulverization was conducted in the same manner as in Example 1 except that the peripheral speed v was set to 6 m/s. The results are shown in Table 2.

Example 3

<Average Particle Diameter-Adjusting Step>

Pulverization was conducted in the same manner as in Example 1 except that the peripheral speed v was set to 8 m/s. The results are shown in Table 2.

Example 4

<Average Particle Diameter-Adjusting Step>

Pulverization was conducted in the same manner as in Example 1 except that the peripheral speed v was set to 10 m/s. The results are shown in Table 2.

Example 5

<Average Particle Diameter-Adjusting Step>

Pulverization was conducted in the same manner as in Example 1 except that the peripheral speed v was set to 12 m/s. The results are shown in Table 2.

Example 6

<Average Particle Diameter-Adjusting Step>

Pulverization was conducted in the same manner as in Example 1 except that the bead diameter D was set to 200 μm. The results are shown in Table 2.

Example 7

Average Particle Diameter-Adjusting Step

Pulverization was conducted in the same manner as in Example 6 except that the peripheral speed v was set to 12 m/s. The results are shown in Table 2.

Reference Example 1

<Average Particle Diameter-Adjusting Step>

Pulverization was conducted in the same manner as in Example 1 except that the bead diameter D was set to 500 μm. The results are shown in Table 2.

Reference Example 2

<Average Particle Diameter-Adjusting Step>

Pulverization was conducted in the same manner as in Reference Example 1 except that the peripheral speed v was set to 6 m/s. The results are shown in Table 2.

Reference Example 3

<Average Particle Diameter-Adjusting Step>

Pulverization was conducted in the same manner as in Reference Example 1 except that the peripheral speed v was set to 8 m/s. The results are shown in Table 2.

Reference Example 4

<Average Particle Diameter-Adjusting Step>

Pulverization was conducted in the same manner as in Reference Example 1 except that the peripheral speed v was set to 10 m/s. The results are shown in Table 2.

Reference Example 5

<Average Particle Diameter-Adjusting Step>

Pulverization was conducted in the same manner as in Reference Example 1 except that the peripheral speed v was set to 12 m/s. The results are shown in Table 2.

Comparative Example 2

<Average Particle Diameter-Adjusting Step>

Pulverization was conducted in the same manner as in Example 1 except that beads made of aluminum (manufactured by Taimei Chemicals Co., Ltd, true specific gravity d=3.6) were used. The results are shown in Table 2.

Example 8

<Average Particle Diameter-Adjusting Step>

Pulverization was conducted in the same manner as in Comparative Example 2 except that the peripheral speed v was set to 12 m/s. The results are shown in Table 2.

Reference Example 6

Average Particle Diameter-Adjusting Step

In order to make the average particle diameter further small, the slurry obtained in Example 1 was wet pulverized again with a bead mill (Ultra Apex Mill manufactured by Kotobuki Industries Co., Ltd. was used). Specifically, the slurry of Example 1 was pulverized at a peripheral speed of v=2 m/s over 6 hours using beads made of yttria-stabilized zirconia (manufactured by Nikkato Corporation, true specific gravity d=6 g/cm$^3$) and having a bead diameter D=50 μm. The value of dDv was 600.

Drying of Sample

The solvent in the slurry obtained in the average particle diameter-adjusting step was removed with a rotary evaporator, and the measurement of N/C, the measurement of the content of the metal element X and the contamination ratio, and the measurement of the average particle diameter were conducted. The average particle diameter was not different from the average particle diameter in Example 1 to find that the pulverization did not progress. The results are shown in Table 3.

Reference Example 7

<Average Particle Diameter-Adjusting Step>

Pulverization was conducted in the same manner as in Reference Example 6 except that the peripheral speed v was set to v=6 m/s. The results are shown in Table 3. The average particle diameter was not different from the average particle diameter in Example 1 to find that the pulverization did not progress.

Example 9

<Average Particle Diameter-Adjusting Step>

Pulverization was conducted in the same manner as in Reference Example 6 except that the peripheral speed v was set to 8 m/s. The results are shown in Table 3.

TABLE 2

| | Bead specific gravity d [g/cm$^3$] | Bead diameter D [μm] | Peripheral speed v [m/s] | dDv | N/C | Content ratio of metal element X [% by mass] | Contamination ratio [% by mass] | Average particle diameter [nm] |
|---|---|---|---|---|---|---|---|---|
| Comparative Example 1 | — | — | — | — | 0.21 | 0.5 | 0.0 | 980 |
| Example 1 | 6 | 300 | 2 | 3600 | 0.21 | 0.5 | 0.3 | 290 |
| Example 2 | 6 | 300 | 6 | 10800 | 0.21 | 0.5 | 0.8 | 280 |
| Example 3 | 6 | 300 | 8 | 14400 | 0.21 | 0.5 | 1.0 | 290 |
| Example 4 | 6 | 300 | 10 | 18000 | 0.21 | 0.5 | 7.0 | 270 |
| Example 5 | 6 | 300 | 12 | 21600 | 0.21 | 0.4 | 13.6 | 270 |
| Example 6 | 6 | 200 | 2 | 2400 | 0.21 | 0.5 | 0.1 | 290 |
| Example 7 | 6 | 200 | 12 | 14400 | 0.21 | 0.5 | 0.7 | 200 |
| Reference Example 1 | 6 | 500 | 2 | 6000 | 0.21 | 0.5 | 0.8 | 500 |
| Reference Example 2 | 6 | 500 | 6 | 18000 | 0.21 | 0.5 | 6.5 | 490 |
| Reference Example 3 | 6 | 500 | 8 | 24000 | 0.21 | 0.4 | 17.3 | 470 |
| Reference Example 4 | 6 | 500 | 10 | 30000 | 0.21 | 0.4 | 21.4 | 480 |
| Reference Example 5 | 6 | 500 | 12 | 36000 | 0.21 | 0.4 | 25.3 | 480 |
| Comparative Example 2 | 3.6 | 300 | 2 | 2160 | 0.21 | 0.5 | 0.5 | 800 |
| Example 8 | 3.6 | 300 | 12 | 12960 | 0.21 | 0.5 | 1.8 | 280 |

Example 10

<Average Particle Diameter-Adjusting Step>

Pulverization was conducted in the same manner as in Reference Example 6 except that the peripheral speed v was set to 10 m/s. The results are shown in Table 3.

Example 11

<Average Particle Diameter-Adjusting Step>

Pulverization was conducted in the same manner as in Reference Example 6 except that the peripheral speed v was set to 12 m/s. The results are shown in Table 1.

<Ink-Preparing Step>

Into a vial, 289 µL of the obtained slurry was weighed out, then three spatulas of glass beads and 50 µL of a Nafion (trade name) 5% by mass dispersion (manufactured by Sigma-Aldrich Japan, LLC) were added thereto, and the resultant mixture was irradiated with ultrasonic waves for 20 minutes to prepare an ink. The electrochemical measurement was conducted using this ink. The result is shown in Table 1 and FIG. 1.

vacuum drier to obtain a precursor. The heat treatment step (b), the average particle diameter-adjusting step, and the ink-preparing step were conducted in the same manner as in Comparative Example 3. The results are shown in Table 1.

Example 13

The average particle diameter of the nitrogen-containing carbon material obtained in Comparative Example 4 was adjusted by the same method as in Example 9. The results are shown in Table 1.

Comparative Example 5

To a 2 L round-bottomed flask, 10 g of pyrrole, 20 g of ammonium peroxodisulfate, and 500 g of ion-exchanged water were added, and the resultant mixture was stirred at room temperature for 8 hours. Thereafter, the solvent was removed in a water bath at 60° C. with a rotary evaporator, and the resultant mixture was dried at 80° C. for 2 hours with a vacuum drier to obtain a precursor. The heat treatment was conducted in the same manner as in Comparative Example

TABLE 3

| | Bead specific gravity d [g/cm$^3$] | Bead diameter D [µm] | Peripheral speed v [m/s] | dDv | N/C | Content ratio of metal element X [% by mass] | Contamination ratio [% by mass] | Average particle diameter [nm] |
|---|---|---|---|---|---|---|---|---|
| Example 1 | 6 | 300 | 2 | 3600 | 0.21 | 0.5 | 0.3 | 290 |
| Reference Example 6 | 6 | 50 | 2 | 600 | 0.21 | 0.5 | 0.5 | 290 |
| Reference Example 7 | 6 | 50 | 6 | 1800 | 0.21 | 0.5 | 0.6 | 290 |
| Example 9 | 6 | 50 | 8 | 2400 | 0.21 | 0.5 | 0.7 | 100 |
| Example 10 | 6 | 50 | 10 | 3000 | 0.21 | 0.5 | 0.7 | 70 |
| Example 11 | 6 | 50 | 12 | 3600 | 0.21 | 0.5 | 0.7 | 50 |

Comparative Example 3

<Heat Treatment Step (b)>

On a quartz boat, 2.0 g of the nitrogen-containing carbon material obtained in Comparative Example 1 was placed, and the quartz boat was housed in a quartz tubular furnace having an inner diameter of 36 mm. The temperature in the furnace was raised from room temperature to 975° C. over 60 minutes under an ammonia gas flow at 1 NL/min in atmospheric pressure, and was held at 975° C. for 1 hour to obtain 0.26 g of a nitrogen-containing carbon material. The measurement of each item was conducted in the same manner as in Comparative Example 1. The results are shown in Table 1 and FIG. 1.

Example 12

The average particle diameter of the nitrogen-containing carbon material obtained in Comparative Example 3 was adjusted by the same method as in Example 11. The measurement of each item was conducted in the same manner as in Example 1. The results are shown in Table 1 and FIG. 1.

Comparative Example 4

To a 2 L round-bottomed flask, 20 g of pyrrole, 0.58 g of iron(III) chloride, and 500 g of diethyl ether were added, and the resultant mixture was stirred at room temperature for 8 hours. Thereafter, the solvent was removed in a water bath at room temperature with a rotary evaporator, and the resultant mixture was dried at 80° C. for 2 hours with a 1 except that the temperature was set to 1200° C. The average particle diameter-adjusting step and the ink-preparing step were conducted in the same manner as in Example 9. The results are shown in Table 1.

It was understood that there was a tendency that the rate of the contamination originating in beads becomes large as the peripheral speed increases in Examples 1 to 5. Moreover, Reference Examples 1 to 5 were examples showing an overall tendency in the case where the peripheral speed v was changed, and Reference Examples 6 to 7 and Examples 9 to 11 were examples showing a tendency in the case where re-pulverization was conducted.

The present application is based on Japanese Patent Application (Japanese Patent Application No. 2014-047414) filed with Japan Patent Office on Mar. 11, 2014, the content of which is incorporated herein by reference.

INDUSTRIAL APPLICABILITY

The nitrogen-containing carbon material according to the present invention has industrial applicability as an electrode material for a fuel cell or other materials.

The invention claimed is:

1. An ink comprising a nitrogen-containing carbon material comprising:
    a nitrogen atom;
    a carbon atom; and
    a metal element X;
    wherein the metal element X comprises at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au, an atomic ratio (N/C) of the nitrogen atom to the carbon atom is 0.005 to 0.3, a content of the metal element X is 0.5 to 20% by mass, an average particle diameter is 1 to 300 nm; and an amount of impurities is 0.3 to 3% by mass.

2. The ink according to claim 1, wherein the metal element X comprises iron and/or cobalt.

3. The ink according to claim 1, wherein the average particle diameter is 1 to 100 nm.

4. An electrode for a fuel cell, comprising a nitrogen-containing carbon material comprising:

a nitrogen atom;

a carbon atom; and a metal element X;

wherein the metal element X comprises at least one selected from the group consisting of Ti, V, Cr, Mn, Fe, Co, Ni, Cu, Nb, Mo, Ru, Rh, Pd, Ag, Hf, Ta, W, Re, Os, Ir, Pt, and Au, an atomic ratio (N/C) of the nitrogen atom to the carbon atom is 0.005 to 0.3, a content of the metal element X is 0.5 to 20% by mass, an average particle diameter is 1 to 300 nm; and an amount of impurities is 0.3 to 3% by mass.

5. The electrode for a fuel cell according to claim 4, wherein the metal element X comprises iron and/or cobalt.

6. The electrode for a fuel cell according to claim 4, wherein the average particle diameter is 1 to 100 nm.

* * * * *